United States Patent [19]

Feinson

[11] Patent Number: 4,754,474
[45] Date of Patent: Jun. 28, 1988

[54] INTERPRETIVE TONE TELECOMMUNICATION METHOD AND APPARATUS

[76] Inventor: Roy W. Feinson, 413 10th St., #C, Huntington Beach, Calif. 92648

[21] Appl. No.: 789,473

[22] Filed: Oct. 21, 1985

[51] Int. Cl.⁴ ............................................. H04N 11/00
[52] U.S. Cl. ...................................... 379/96; 379/52; 379/97; 340/825.48
[58] Field of Search ................... 179/2 A, 2 DP, 6.08, 179/6.11; 340/825.48, 825.74; 381/44; 379/52, 77, 93, 96, 97, 102, 104, 105

[56] References Cited

U.S. PATENT DOCUMENTS

| | | |
|---|---|---|
| 4,164,025 | 8/1979 | Dubnowski et al. |
| 4,307,266 | 12/1981 | Messina .............................. 179/2 DP |
| 4,608,457 | 8/1986 | Fowler ................................ 179/2 A |
| 4,608,460 | 8/1986 | Carter et al. ....................... 179/6.11 |
| 4,649,563 | 3/1987 | Riskin .................................... 379/97 |
| 4,650,927 | 3/1987 | James .............................. 379/97 X |
| 4,674,112 | 6/1987 | Kondraske et al. ................... 379/96 |
| 4,677,659 | 6/1987 | Dargan .................................. 379/97 |

FOREIGN PATENT DOCUMENTS 58-131857  8/1983  Japan ............................. 179/2 DP

OTHER PUBLICATIONS

Pavlak et al., "KEYPAC-A Telephone Aid for the Deaf," *IEEE Transactions on Communications*, vol. Com.-27, No. 9, Sep. 1979, pp. 1366-1371.
Rabiner et al., "Digital Techniques for Computer Voice Response: Implementation & Applications," *Proceedings of the IEEE*, vol. 64, No. 4, Apr. 1976, pp. 416-433.
Smith et al., "Alphabetic Data Entry Via the Touch-Tone Pad: A Comment", *Human Factors*, vol. 13(2), Apr. 1971, pp. 189-190.
Sederholm et al., "Intelligent Telephone," *IBM Technical Disclosure Bulletin*, vol. 23, No. 9, Feb. 1981, pp. 4006-4008.

*Primary Examiner*—Keith E. George
*Attorney, Agent, or Firm*—William L. Chapin

[57] ABSTRACT

A telecommunication method and apparatus for the deaf and hearing impaired uses the discrete dual frequency tones produced by each button on a telephone key pad to represent one of three letters inscribed on each key. Apparatus at the deaf person's receiving telephone assembles the sequences of number values identifying each letter group containing each letter in a transmitted word. Comparison apparatus within the receiving apparatus, preferably controlled by a microprocessor, compares the sequences of letter groups with allowed sequences of letter groups corresponding to predetermined words stored within an electronic dictionary memory within the apparatus. When a perfect match has been obtained, the word interpreted from each triply ambiguous letter group corresponding to each transmitted letter is displaying visually on a CRT for the deaf person. Under microprocessor control, this procedure takes a fraction of a second per word lookup.

2 Claims, 2 Drawing Sheets

INTERPRETIVE TONE TELECOMMUNICATION METHOD AND APPARATUS

BACKGROUND OF THE INVENTION

1. Field of the Invention

This invention relates to methods and devices for use in telecommunications. More particularly, the invention relates to telecommunication methods and devices in which DTMF (Dual-tone, multi-Prequency tones are used to represent alpha-numeric characters. The specific and major application intended for the present invention is tone telecommunications for the deaf and hearing impaired.

2. Description of Background Art

It is estimated that there are two hundred and twenty thousand deaf and hearing impaired people in California alone, and over five million such people in the United States. There are presently existing devices on the market which permit deaf and hearing impaired people to communicate by telephone. However, those presently existing devices are not entirely adequate for serving the needs of the deaf and hearing impaired population, for reasons which will now be described.

The two most frequently used types of TDD's (telecommunication devices for the deaf) currently available require both the deaf user and the caller to possess a TDD. Presently available TDD's have the general appearance of a typewriter with a phone cradle on which a telephone handset may be placed. The phone cradle comprises the input/output portion of a part of the TDD called an acoustically coupled modem. The modem permits electrically generated, audible signals which are used by the TDD to send messages to be coupled into the microphone portion of the telephone handset. There the acoustic signals are converted into electrical signals for transmission over the telephone lines. In addition to its transmission function, the modem processes received signals. In this mode, the modem reconverts electrical signals received over the telephone line and converted to audible signals in the receiver of the telephone handset into electrical signals utilized by the TDD to produce visual messages on a TV-like display screen. Deaf people using the TDD view messages displayed on the screen, and can type an answering message by using the TDD typewriter.

Existing TDD's are expensive, costing between three hundred and seven hundred dollars each, with an average price of approximately five hundred dollars. Moreover, both the deaf party and any party wishing to communicate with him via a TDD must have their own TDD. Thus, the minimum capital outlay to permit communication via existing TDDs is approximately one thousand dollars.

A possible disadvantage of using TDDs is pointed out by Suzette Schuster, a telephone worker for the hearing impaired who states: "(the deaf)....are afraid they'll lose their speaking skills if they use TDDs." So, although existing TDDs are useful to the deaf community, as well as having applications in a number of emergency services, those considerations mentioned above limit their more extensive use by the deaf and hearing impaired population.

In an apparent effort to provide alternate methods of telecommunications for the deaf and hearing impaired, a substantive amount of inventive activity has been undertaken. The United States patents described below are evidence of that inventive activity.

Chieffo, in U.S. Pat. No. 3,585,303, June 15, 1971, discloses an instrument which converts standard electrical telephone signals into flashing light signals. These may be used by a deaf person to receive very rudimentary communications provided the caller has been appraised of the coding system to be used. An oscillator controlled by a telegraph key produces tones which permit flashing lights at another deaf person's station equipped with the apparatus to communicate Morse code messages.

Meyer, in U.S. Pat. No. 4,012,599, March 15, 1977, discloses a telephone communications system for the deaf which utilizes a standard 12 or 16 pushbutton telephone to transmit signals which are decoded and displayed as an alpha numeric message to a deaf person. The system employs a coding scheme, which must be learned by the signal transmitter, requiring two keystrokes for each letter, and 4 keystrokes for numbers and other symbols.

Coles, in U.S. Pat. No. 4,191,854, March 4, 1980, discloses an apparatus for converting sequences of standard DTMF tones, keyed in according to a pre-determined coding sequence, into LED display characters. For example, one actuation of pushbutton 5 results in the display of "J", two pushes a "K" and three pushes an "L".

Perkins, in U.S. Pat. No. 4,293,855, Oct. 6, 1981, discloses a communication device for use by handicapped persons. A keyboard switch or feedback switch operated by body movement selects and displays a desired sequence of characters or messages.

Messina, in U.S. Pat. No. 4,307,266, Dec. 22, 1981, discloses a communication device coupled to a standard telephone which has an alpha-numeric rotary dial or push-button keyboard. A code requiring two consecutive push button entries or rotary dial actuations is utilized to send signals representing letters or numbers over standard telephone lines. A decoder at the receiving telephone station converts the sequence of two-digit coded character signals into an alphanumeric display message for the deaf, or a synthesized speech signal for those who can hear.

Underkoffler, in U.S. Pat. No. 4,426,555, Jan. 17, 1984, discloses a DTMF-tone system for communicating messages by telephone to hearing impaired person. The system employs the sequential actuation of two keys of a standard 12-tone DTMF-tone key pad to transmit each character in a message. Pressing one of the first nine buttons in the key pad signifies which group of three characters is to be transmitted. Pressing keys 10, 11 or 12 signifies that the character desired is the first, second or third, respectively, in the group. Decoding logic at the receiving telephone assembles the sequence of two consecutive DTMF tones into a sequence of characters which are displayed visually in serial fashion to form a message for the hearing impaired.

Tsakanikas, in U.S. Pat. No. 4,427,848, Jan. 24, 1984, discloses use of a sequence of actuations of DTMF-tone signals to represent alpha-numeric characters. In one mode, alphabetic characters are transmitted by depressing a designated key (e.g., *) a number of times equal to the relative position of the inscription of the character on the key (i.e., the placement division of the alphabetic character), followed by the depression of the key on which the character is inscribed. In another mode, an alphabetic character is represented by depressing the particular key on which the character is inscribed a number of times equal to the placement division of the character.

The foregoing patents disclose systems for communications with deaf persons which employ DTMF-tone or rotary dial telephones. Each of the systems disclosed requires the use of two to four keystrokes to transmit each character in a sequence of characters conveying a message. Moreover, each of the systems disclosed requires the sender to learn a more or less complicated coding scheme to transmit characters. The present invention overcomes some of the disadvantages inherent in prior existing TDD devices, as will become apparent from a reading of the description of the present invention which appears below.

OBJECTS OF THE INVENTION

An object of the present invention is to provide a telecommunication method and apparatus for the deaf and hearing impaired which requires the existence of special equipment only at the deaf or hearing impaired party's telephone.

Another object of the invention is to provide a telecommunication method and apparatus for the deaf which permits communication between the deaf parties' telephone and any other telephone in the world.

Another object of the invention is to provide a telecommunication device for the deaf which is low in cost.

Another object of the invention is to provide a telecommunication device for the deaf which may utilize existing home computer equipment.

Another object of the invention is to provide a method and apparatus for telecommunicating by the deaf which is easy for the deaf person to learn and utilize.

Another object of the invention is to provide a method and apparatus for telecommunicating by the deaf which may be immediately and effectively utilized by an untrained person who calls a deaf person without any advance knowledge that the person whom he has called is deaf.

Various other objects and advantages of the present invention, and its most novel features, will become apparent to those skilled in the art by reading the accompanying specifications and claims.

It is to be understood that although the invention disclosed herein is fully capable of achieving the objects and providing the advantages described, the description of the invention contained herein is merely illustrative of the preferred embodiments. Accordingly, I do not intend that the scope of my exclusive rights and privileges in the invention be limited to the details of the embodiments described. I do intend that reasonable equivalents, adaptations and modifications of the various embodiments and alternate forms of the present invention which are described herein be included within the scope of this invention as particularly pointed out by the appended claims.

SUMMARY OF THE INVENTION

Briefly stated, the present invention comprehends an interpretive, microprocessor-controlled telecommunication method and apparatus for use by deaf and hearing impaired persons. The method preferably uses telephones having a keypad which produces DTMF (Dualtone, multi-frequency:) dialing signals, such as the Touch-Tone brand apparatus produced by American Telephone and Telegraph Company. Functionally, the method and apparatus, according to the present invention, operate as follows.

When the phone rings in the home of the deaf party equipped with the apparatus according to the present invention a conventional answering machine greets the caller with a brief recorded message, typically 20-seconds long. The recorded message instructs the caller to use the DTMF key pad on the caller's telephone to spell out his message by sequentially depressing those DTMF keys corresponding to the letters of each word in his message, and to depress certain non-lettered keys to signify the end of a word or the end of a sentence.

At the deaf person's telephone installation, the apparatus according to the present invention uses a conventional tone decoder to generate a discrete digital signal having a number value corresponding to each of the 12 possible DTMF keys pressed by the caller. An electronic temporary memory element comprising part of the apparatus stores the sequence of number values outputted by the tone decoder and corresponding to the letters of each word transmitted by the caller. Since each number value stored in the memory element can represent any one of three different letters of the alphabet, it is necessary to use an interpretive method to determine which of the three letters the caller intended to signify by depressing a particular DTMF key. A microprocessor or other computing means used by the apparatus compares the sequence of letter groups corresponding to the sequence of number values stored in the temporary memory element with a look-up table or "dictionary" of letter groups comprising allowed words. The dictionary of allowed words is stored in a permanent electronic memory. The purpose of the comparison is to interpret what word was entered by the caller.

When an identified match is found between a sequence of received letter groups and a particular word, that word is displayed on a video display terminal. Each word in a transmitted sentence is successively decoded and displayed in horizontal lines on the video display terminal until the caller's entire sentence has been displayed.

DETAILED DESCRIPTION OF THE INVENTION

Figure 1:
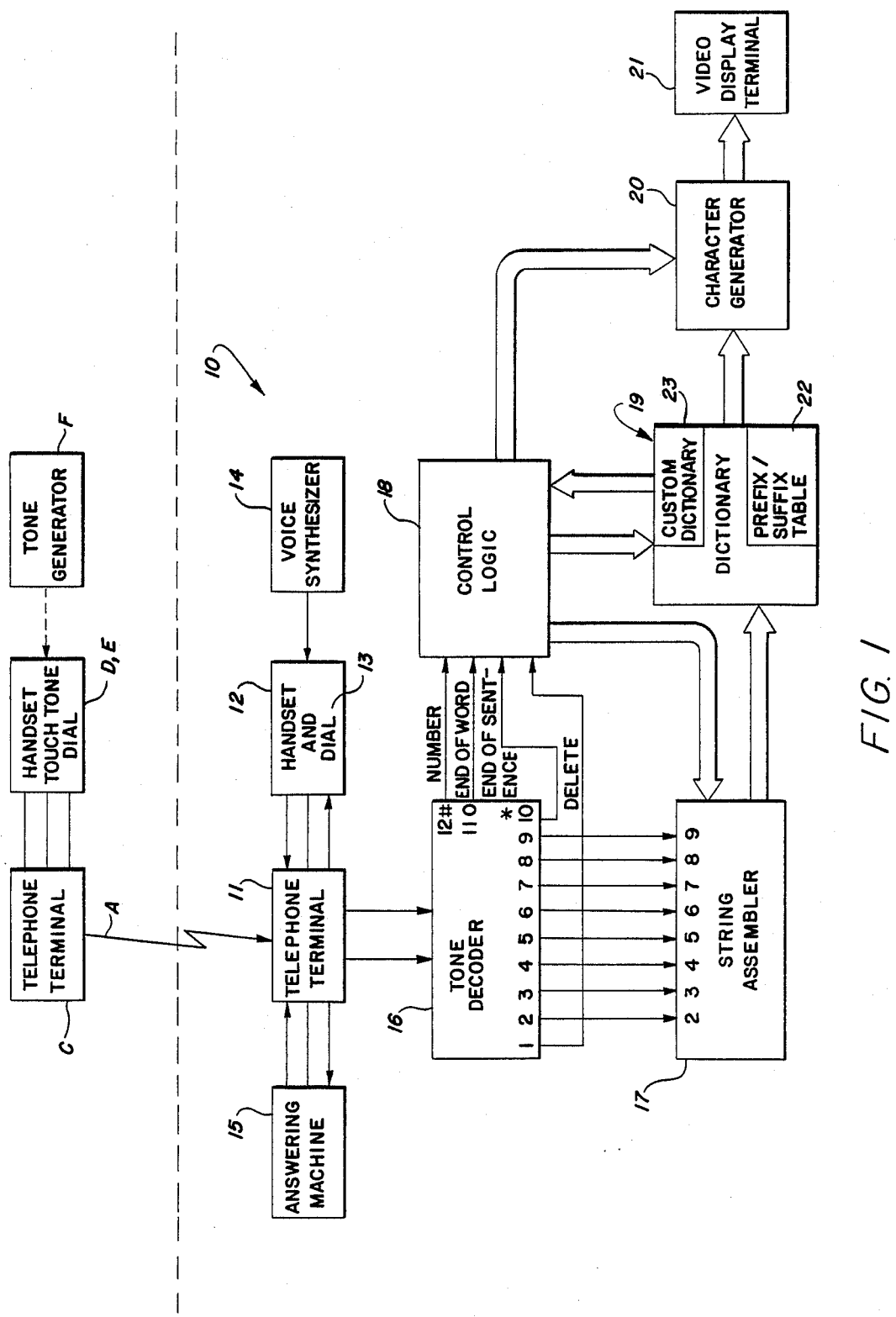
FIG. 1 is a block diagram of the interpretive tone telecommunication system according to the present invention.

Referring now to FIG. 1, a block diagram of the interpretive tone telecommunication system according to the present invention is shown. The Figure includes the novel configuration of the system components comprising the receiving station, as well as a conventional telecommunication link and calling station telephone terminal.

As shown in FIG. 1, the receiving station 10 according to the present invention includes a conventional telephone line terminal 11. Terminal 11 is selectably connectable by a conventional duplex communication link A to another telephone at a calling station B in FIG. 1. Duplex communication link A may consist of any standard means used to transmit telephone conversations including, alone or in combination, electrical cables, fiber optic cables, microwave transceivers, and satellite relay transceivers.

The band width required of communication link A by the present invention is just the same as required for conventional voice telecommunications, typically comprising the frequency range of 250HZ to 3KHZ. Communication link A may be either full duplex, as is typically used in telecommunications links, or half duplex. (A full duplex communication link permits simultaneous transmission of data in two directions, while a half duplex link is capable of transmitting signals alternately but not simultaneously in two directions.)

Calling station B includes a conventional telephone terminal C, a handset D, and a DTMF dial E. For calling stations equipped with a rotary dial or other pulse generating means rather than a DTMF generator, an acoustically coupled DTMF generator F may be used to practice the present invention, as will be described below.

Focusing attention now on receiving station 10 in FIG. 1, a conventional telephone handset 12 and dial 13 are connected to receiving station terminal 11 in a conventional manner. Optionally, a voice synthesizer 14 may be acoustically coupled through the microphone of the telephone handset 12, or may be electronically coupled to terminal 11. The purpose and function of voice synthesizer 14 will be described below.

Receiving station 10 includes a conventional telephone answering machine 15 connected to terminal 11. Answering machine 15 functions in a conventional manner in combination with the other components of receiving station 10. Specifically, answering machine 15 employs a ring detector circuit to generate an off-the-hook status signal in terminal 11, after a predetermined number of ring signals have been transmitted by calling station B to receiving station 10.

After generating an off-the-hook status signal, answering machine 15 transmits a pre-recorded voice message to calling station B. The recorded message instructs the caller to use the DTMF key pad on the caller's telephone to spell out the caller's message by sequentially depressing those DTMF keys corresponding to the letters in each word of the caller's message. The recorded message also instructs the caller to depress the DTMF button labelled (OPER 0) to signify the end of a word, and to depress the DTMF button labelled (*) to signify the end of a sentence. In the last segment of the recorded message, the caller is instructed to depress the DTMF button labelled (#) to signify that DTMF buttons next depressed are to be interpreted as numbers rather than letters. (When the receiving station receives an end-of-word tone signal, tones are once again interpreted as letters rather than numbers.) Finally, the recorded message informs the caller that the DTMF button labelled (1) can be used to perform a delete function, instructing the control logic of the apparatus to ignore the preceding letter or word.

Upon completion of play-back of the above-described voice message, answering machine 15 permits transmission of calling station tones through terminal 11 to the input port of tone decoder 16.

Tone decoder 16 is used to detect which DTMF key has been depressed at calling station B. Decoder 16 signifys this detection function by producing a discrete logic true level signal on a separate one of a set of twelve output lines. Each output line corresponds to a particular dual-frequency tone. The ensemble of twelve DTMF tones commonly used in telecommunications and referred to by the brand name 'TOUCH-TONE' are defined by the following matrix:

|         | 1,209 HZ | 1,336 HZ | 1,477 HZ |
|---------|----------|----------|----------|
| 697 HZ  | 1        | 2        | 3        |
| 770 HZ  | 4        | 5        | 6        |
| 852 HZ  | 7        | 8        | 9        |
| 941 HZ  | *        | 0        | #        |

Thus, for example, in the Touch Tond brand encoding scheme, depressing the "2" button on the calling station telephone produces a tone comprising two discrete frequencies; namely, 697 HZ and 1,336 HZ. When that tone is inputted into tone decoder 16, the logic level at the output port labelled "2" makes a transition from a logic false level to a logic true level, while all of the remaining 11 output ports remain at a logic false level.

Now each digit on a telephone dial or key pad corresponds to a particular group of three letters, as follows:

| 2 | ABC |
|---|-----|
| 3 | DEF |
| 4 | GHI |
| 5 | JKL |
| 6 | MNO |
| 7 | PRS |
| 8 | TUV |
| 9 | WXY |

Therefore, each of the eight output ports 2 through 9 of the tone decoder 16 corresponds to a particular one of the eight letter groups shown above.

The operative interrelationship of the elements of the invention are now most effectively described by setting forth in detail how a typical exemplary message is transmitted and received according to the method and apparatus of the present invention.

For example, a caller would press the following DTMF buttons or keys to transmit the message "Hello." 4 (GHI), 3 (DEF), 5 (JKL), 5 (JKL), 6 (MNO), (0) (to signify the end of a word) and (*) (to signify the end of a sentence).

As has been mentioned above, tone decoder 16 outputs a discrete logic "true" level for each of eight discrete DTMF keys containing letters, namely: (2 ABC), (3 DEF), (4 GHI), (5 JKL), (6 MNO), (7 PRS), (8 TUV), (9 WXY). The numbers two through nine associated with each DTMF key signal are referred to herein as the value of the signal, for facilitating the description of operation of the invention which appears below.

Now each of the eight discrete tone decoder output ports is coupled to the input port of a temporary memory storage element 17, referred to as a string assembler in FIG. 1. Memory element 17 is preferably a random access memory (RAM). Control logic block 18, operating in a manner well-known to those skilled in logic design or microprocessor architecture, utilizes end-of-word and end-of-sentence signals coupled to the control logic block from the tone decoder 16 to assemble the five sequentially occurring tone decoder signals representing the work "hello" into five sequential four-bit memory locations in memory element 17. Thus, memory element 17, controlled by control logic block 18, functions as a string assembler, assembling in proper sequential order strings of DTMF key pad depression signals corresponding to letters in a word.

Now each of the eight possible DTMF key pad number signals which may be stored in each sequential location in the string assembled in memory 17 corresponds to three possible letters of the alphabet. For example, DTMF button "2" corresponds to either A, B or C, and DTMF button "3" corresponds to D, E or F. Therefore, since no a priori knowledge exists at the receiving end as to which of three possible letters the caller intended to signify by pressing a particular DTMF button, an interpretive decoding scheme must be used to determine which letter was intended. The method and apparatus for performing the required interpretive decoding comprises a novel an important aspect of the present invention, as will now be described.

As shown in FIG. 1, a read output port of memory 17 is coupled by a data bus to a memory element 19 which functions as a dictionary or look-up table. Memory element 19 is preferably a pre-programmed programmable read-only memory (PROM).

Memory element 19 contains in segmented blocks of sequential memory addresses sequences of 8-bit bytes representing each letter of a particular word stored in the dictionary, or look-up table which the memory contains. For example, the word "FORM" is stored in four consecutive memory locations, one for each letter of the word. The coding of each 8-bit byte in each memory location is most easily described by example. The letter "F" appears on the DTMF button labelled (3 DEF) and assigned a "value" of 3. Since "F" is in the third position on the button having a value of three, "F" is represented in one 8-bit dictionary byte by: 1100 0011

| 1100 | 0011 |
|---|---|
| position = 3 | value = 3 | the two higher order bits of the 8-bit dictionary letter designate the position of the letter on the DTMF button (1, 2, or 3). The four lower order bits represent the value of the DTMF button (2–9). Thus, the word "FORM" is stored in 4 consecutive address locations in memory 19 as follows.

| Memory Location | Position | Value | | |
|---|---|---|---|---|
| 1 "F" | 3 | 3 | 1100 | 0011 |
| 2 "O" | 3 | 6 | 1100 | 0110 |
| 3 "R" | 2 | 7 | 1000 | 0111 |
| 4 "M" | 1 | 6 | 0100 | 0110 |

Words are stored in the dictionary in memory element 19 in sequential memory block addresses in accordance with the value and position of the first letter of the word, and in accordance with the number of letters in the word. Specifically, words having lower values and fewer numbers of letters are stored in lower memory addresses. A few entries in the dictionary will illustrate this ordering. Starting with the lowest value for the first letter of a word, we have the numbers 2 corresponding to an A, B or C. Thus, the first word in the first address location of the dictionary is that word having the lowest value and lowest number of letters, namely, "A". the word located in the next dictionary address is "AM", and the contents of the first few dictionary addresses are as follows:

TABLE 1

| Memory Location | Word | Value of 1st Letter | Number of Letters | Value of 2nd Letter |
|---|---|---|---|---|
| 1 | A | 2 | 1 | |
| 2 | AM | 2 | 2 | 6 |
| 3 | AN | 2 | 2 | 6 |
| 4 | AS | 2 | 2 | 7 |
| 5 | AT | 2 | 2 | 8 |
| 6 | BE | 2 | 2 | 3 |
| 7 | BY | 2 | 2 | 9 |
| 8 | ACT | 2 | 3 | 2 |

Figure 2:
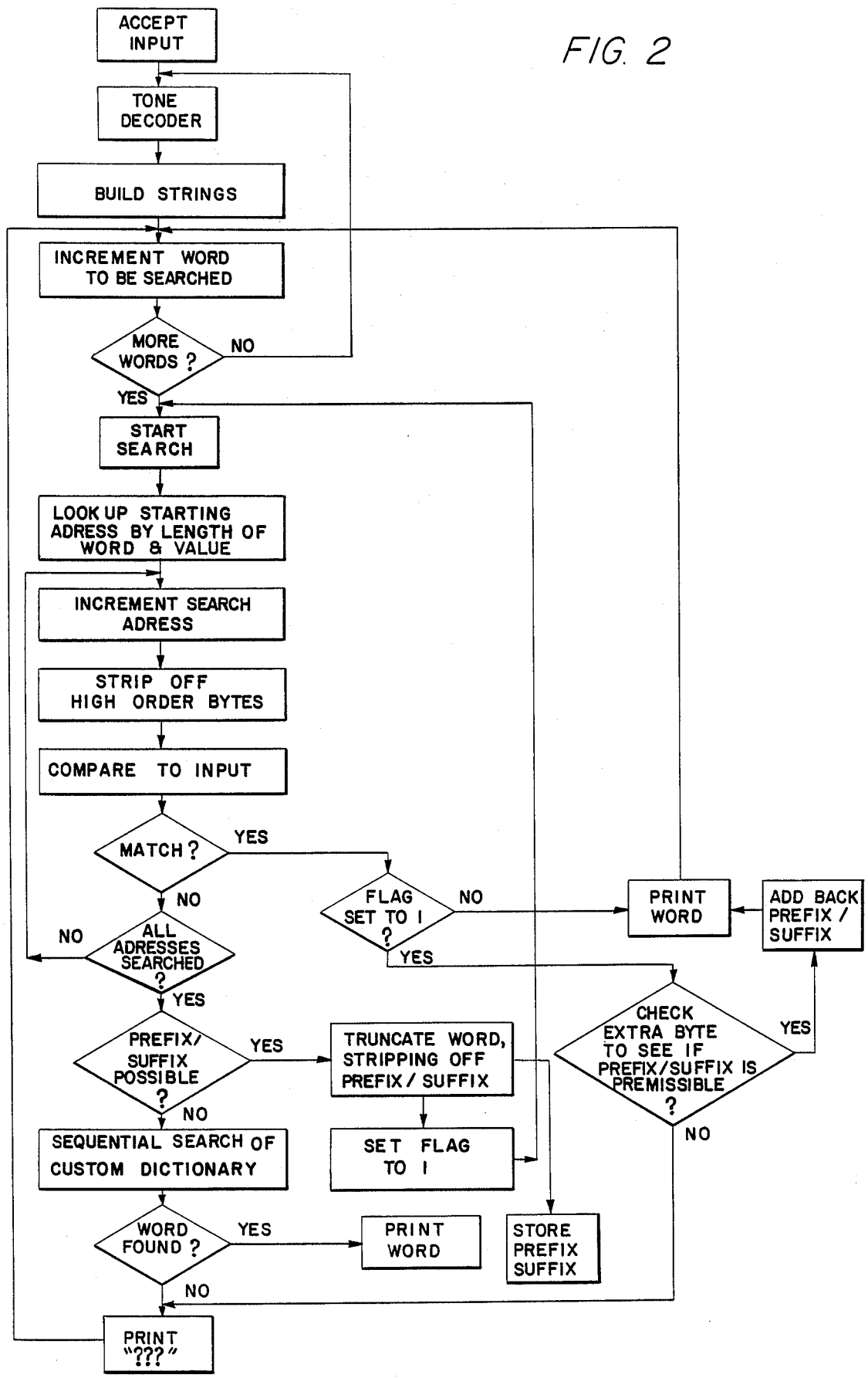
FIG. 2 is a flow chart illustrating the operations performed by the system depicted in FIG. 1.

The functional operation of the novel interpretive decoding method and apparatus of the present invention can probably be best understood by referring to the operational flow chart shown in FIG. 2, while reading the following description of a typical decoding operation.

Taking the example of the word "FORM", a caller would spell out that word by sequentially pushing DTMF buttons (3 DEF), (6 MNO), (7 PRS), (6 MNO). This would result in the number sequence 3676 being stored in the string assembler memory 17. Now the first letter in the unknown word has a value of 3. Also, the unknown word has 4 letters. Thus, a search for a word having letters corresponding to values 3, 6, 7, and 6 would be initiated in that portion of the dictionary memory 19 having 3 as the value of the first letter, and having four letters To determine what word is designated by 3676, a comparison is made between each value of each letter position in the unknown word with the value of the letter in the corresponding position of the dictionary word. To perform the comparison, the four higher order bits in the first letter of the dictionary word are stripped off, leaving the lower four bits representing the values 2 through 9. The lower four bits representing the value of the first letter of the dictionary word in memory 19 are then compared with the four-bit value of the first letter in the unknown word in memory 17. If the first letter value in the unknown word in memory 17 matches the first letter value in the dictionary word in memory 19, the second letters are compared. In an exactly analogous fashion, each letter value in the unknown word is compared with the letter value of the dictionary word. If any corresponding letters do not match, the search address is incremented to search the next dictionary word having the same first letter value and the same number of letters for a perfect match. When a perfect match has been obtained, the dictionary word is decoded and displayed on a video display terminal 21, as will be described in more detail below.

Following the matching procedure described for the example of the unknown word 3676, suppose that the first dictionary memory address location containing a word beginning with the value 3 and having four letters contained the word "FARM" at memory locations 4001 through 4004, for example. The first letter values would match, but not the second. Therefore, control logic in the apparatus would direct the unknown word to be compared with the next dictionary word having four letters and beginning with the value 3. Suppose, for example, this word were "FORM", stored at memory locations 4005 through 4008. A comparison of each letter value of the unknown word 3676 with the values stored at memory locations 4005 through 4008 would yield a perfect match indicating that the unknown word is "FORM".

To display a received word which has been precisely matched with a dictionary word as has been described above, the following method is used. The upper two bits representing position and lower four bits representing value of the last letter in a matched dictionary word are successively inputted into a character generator 20. Character generator 20 comprises essentially a nonvolatile memory element with eight input address lines and 26 output ports, one for each letter of the alphabet. In addition, character generator 20 has additional output lines for each of the numerals 0 through 9. Character generator 20 functions essentially as a look-up table, outputting a different character for each different 8-bit number inputted to it. Thus for the example discussed above, the upper two bits and lower four bits of each of the numbers in memory address locations 4005 through 4008 are sequentially inputted into character generator 20 to produce the letters F, O, R, and M and print or display them on video display terminal 21.

The method and apparatus of the present invention for performing interpretive decoding of a sequence of keystrokes of a DTMF key pad and just described are novel and efficient. However, the present invention includes refinements which minimize even further the amount of memory space required for the dictionary used in the novel interpretive decoding method and apparatus just described.

By adding a single eight-bit byte in a memory address following the address of the last letter in a "N" letter dictionary word, the number of words stored in the (N+1) addresses can be increased from one word to as many as nine words. This is accomplished by signifying, in the (N+1)th address, allowable prefixes and suffixes which may be appended to the word contained in the "N" memory address locations. Those prefixes and suffixes which may modify a root word, and the bit position in the number stored in the (N+1)th address signifying the allowability, are shown in Table 2.

TABLE 2

PREFIX AND SUFFIX WORD CODES

| Prefix or Suffix | Value Code | Example | Code |
|---|---|---|---|
| -ing | 464 | Forming | 1. 00000001 |
| -ed | 33 | Formed | 2. 00000010 |
| -s | 7 | Forms | 3. 00000100 |
| -er | 37 | Former | 4. 00001000 |
| -(X)(x) ing | 464 | Running | 5. 00010000 |
| -d | 3 | Aged | 6. 00100000 |
| re- | 73 | Reform | 7. 01000000 |
| un- | 86 | Undo | 8. 10000000 |

As in indicated in Table 2, the root word "FORM" can have suffixes or prefixes corresponding to bit positions 1, 2, 3, 4, and 7 in the (N+1)th word. Thus the (N+1)th word, stored in memory address location 4009 after the "M" stored in memory address location 4008, would be 01001111. In this example, the root word FORM plus its five derivative words produced by appending a prefix or suffix comprise a set of six different words stored in five memory locations.

The decoding of a value string in the string assembler 17 to form a suffix or prefix derivative of a root word stored in the dictionary is performed as follows. Referring again to the flow chart shown in FIG. 2, it is seen that if a match is not found between a letter value string and a dictionary word, the letter-value string is checked to see if it might have a prefix or suffix. This is done by comparing the first two and the last three numbers in a string with numbers in a look-up memory table 22, which may be a subset of data stored in memory element 19. For example, if the first two numbers in a letter string were 73, this would indicate a prefix of "RE-, as shown in Table 2. If a potentially permissible prefix or suffix is found by comparison of the beginning or ending number values in a letter-value string with codes in a look-up table, that prefix or suffix is stripped off of the letter string and stored. Also, a flag is set within the computer operating system.

Next, the root word is inputted to the search procedure previously described. If the root word finds an identical match, the (N+1)th memory address (i.e., the next address after the address of the last letter in the dictionary word), is checked to see if the prefix or suffix stripped from the input word and stored, is permissibly appended to the root word. In the present example, the (N+1)th number indicates that the prefix RE is permissibly appended to FORM. Thus, the letters RE would be printed out and displayed, followed by the letters FORM to spell out REFORM.

As shown in the flow chart of FIG. 2, letter strings not matching with any dictionary words according to the procedure described above, may be compared with words in a custom dictionary 23 created by the user. The custom dictionary can contain proper names, technical words and the like, deemed to be useful by the deaf or hearing impaired user of the system. These custom words can be stored in different blocks of the same memory used for the standard dictionary, preferably at higher address numbers.

If a letter-value string does not match a word contained in either the standard or custom dictionary, 'N'—Question Marks are displayed on the screen—where 'N' is the number of letters in the word.

What is claimed is:

1. An interpretive tone telecommunication method comprising;

(a) transmitting a sequence of discrete signals, each signal corresponding to a plurality of characters containing the particular character desired to be transmitted in said sequence;

(b) receiving said sequence of signals, and temporarily storing in a ordered sequence a discrete value corresponding to each discrete signal received in said sequence;

(c) comparing said ordered sequence of discrete values with a plurality of pre-stored allowed sequences of discrete values corresponding to particular words;

(d) producing a first command signal if and when said ordered sequence of discrete values exactly matches one of said pre-stored sequences of discrete values, (e) displaying a word corresponding to said pre-stored sequence of discrete values upon production of said first command signal, (f) producing a second command signal if and when said ordered sequence of discrete values fails to exactly match any one of said pre-stored sequences of discrete values, (g) comparing in response to said second command signal a beginning subsequence comprising the first m values and an ending subsequence comprising the last n values of said ordered sequence of discrete values, where m and n are integers, with a second plurality of pre-stored allowed sequences of discrete values corresponding to particular prefixes and suffixes;

(h) producing a third command signal if and when said beginning or ending subsequences of values exactly matches one sequence of said plurality of second pre-stored sequences of discrete values coresponding to particular prefixes and suffixes, and storing a code corrresponding to said matched prefix or suffix, truncating said ordered sequence of discrete values to produce a truncated word by removing said matched subsequence of values from said ordered sequence of values upon production of said third command signal;

(i) comparing said truncated ordered sequence of discrete values with said first plurality of pre-stored allowed sequences of discrete values corresponding to particular words;

(j) producing a first command signal if and when said ordered sequence of discrete values exactly matches one sequence of said plurality of first pre-stored sequences of discrete values;

(k) checking code bits stored with said matched ordered sequence to determine if said stored prefix or suffix code indicates an allowed prefix or suffix, and generating a fourth command signal if said prefix or suffix is allowed to be appended to said truncated word;

(l) appending said prefix or suffix to said truncated word upon production of said fourth command signal to produce a concatenated word, and (m) displaying said concatenated word.

2. An interpretive telecommunication apparatus comprising;

(a) means for producing a separate discrete value corresponding to each type of a set of allowable received signals, each of which said signals represents at least one character;

(b) means for sequentially assembling and storing a sequence of said discrete values;

(c) means for comparing said sequence of discrete values with each sequence of a plurality of pre-stored sequences of values, each said pre-stored sequence corresponding to a particular word comprised of a sequence of characters;

(d) means for producing a first command signal if and when said sequence exactly matches one sequence of said plurality of pre-stored sequences, (e) means responsive to said command signal for displaying said word corresponding to said pre-stored sequence, (f) means for producing a second command signal if and when said ordered sequence of discrete values fails to exactly match any one sequence of said plurality of pre-stored sequences of discrete values, (g) means responsive to said second command signal for comparing a beginning subsequence comprising the first m values and an ending subseqeunce comprising the last n values where m and n are integers, with a second plurality of pre-stored allowed sequences of values corresponding to particular prefixes and suffixes;

(h) means for producing a third command signal if and when said beginning or ending subsequences of values exactly matches one of said pre-stored sequences in said second plurality of pre-stored sequences of discrete values corresponding to particular prefixes and suffixes, and storing a code corresponding to said matched prefix or suffix (i) means for truncating said ordered sequence of discrete values to produce a truncated word by removing said matched subsequence of values from said ordered sequence of values upon production of said third command signal;

(j) means for comparing said truncated ordered sequence of discrete values with said pre-stored sequences in said first plurality of pre-stored allowed sequences of discrete values corresponding to particular words;

(k) means for producing a first command signal if and when said ordered sequence of discrete values exactly matches one of said pre-stored sequences in said first plurality of prestored sequences of discrete values;

(l) means for checking code bits stored with said matched ordered sequence to determine if said stored prefix or suffix code indicates an allowed prefix or suffix, and generating a fourth command signal if said prefix or suffix is allowed to be appended to said truncated word;

(m) means responsive to said fourth command signal in appending said prefix or suffix to said truncated word to produce a concatenated word, and (n) means for displaying said concatenated word.

* * * * *